Oct. 11, 1932.  H. E. IVES  1,882,424
METHOD OF MAKING RELIEF PICTURES AND MANNER OF VIEWING SAME
Filed May 31, 1930   3 Sheets-Sheet 1
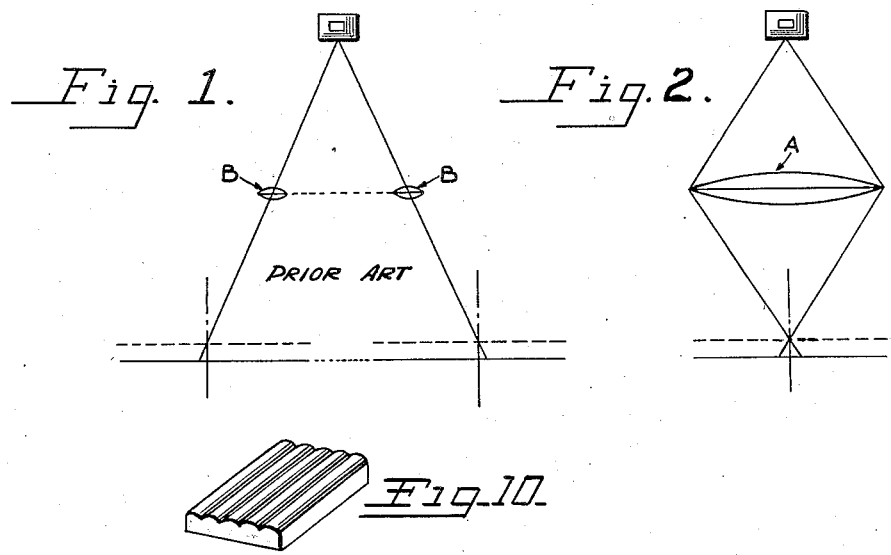
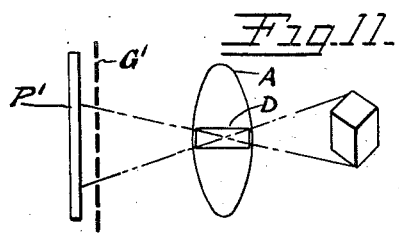
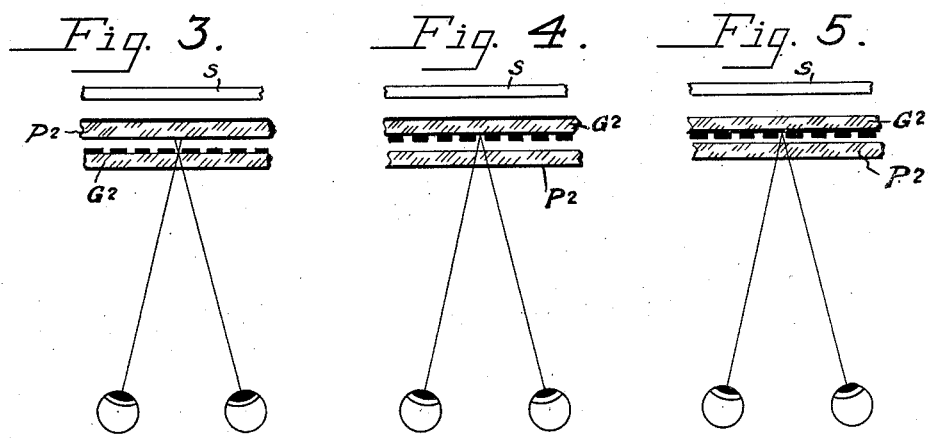
INVENTOR
Herbert E. Ives
BY
Harry Lee Dodson
ATTORNEY

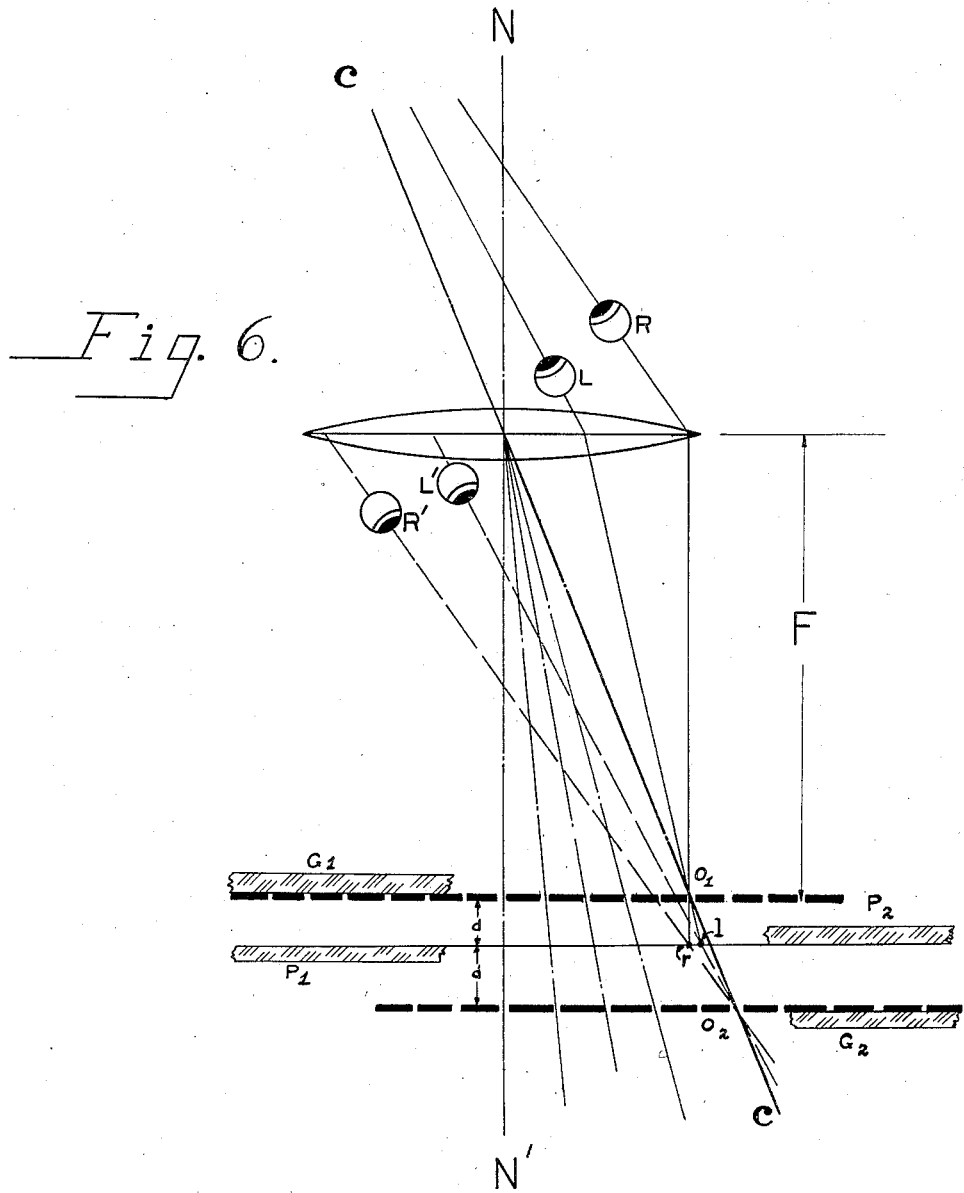

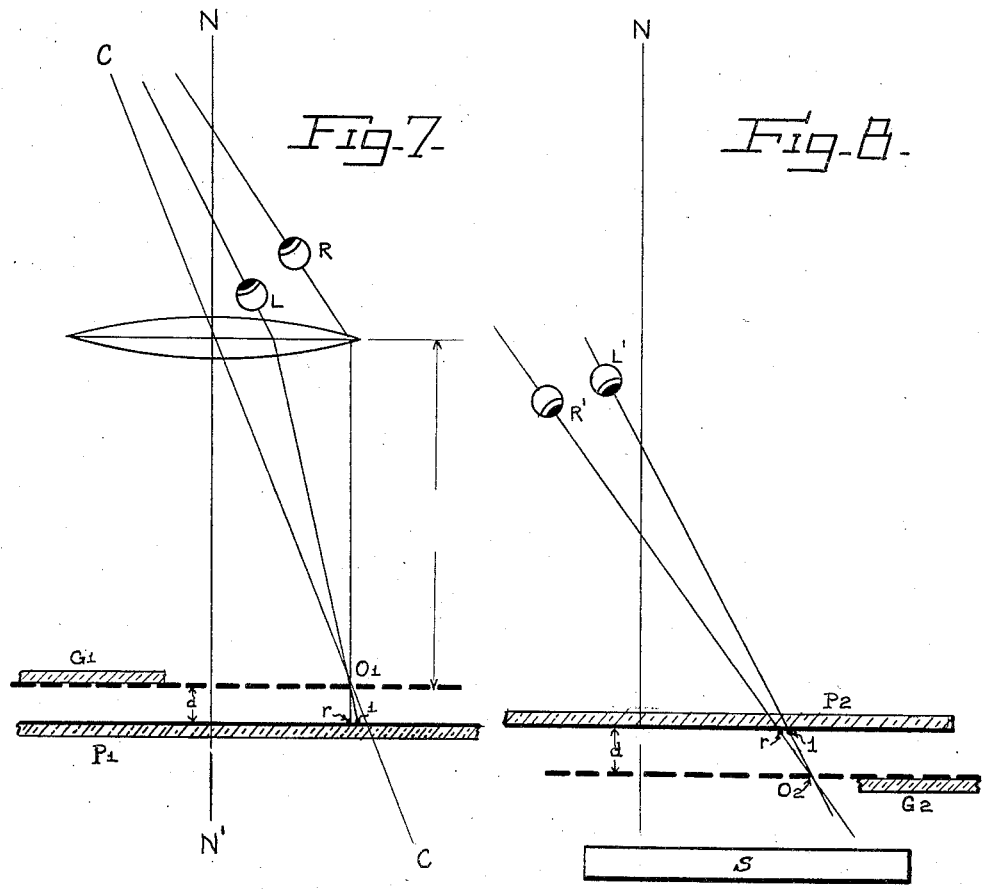
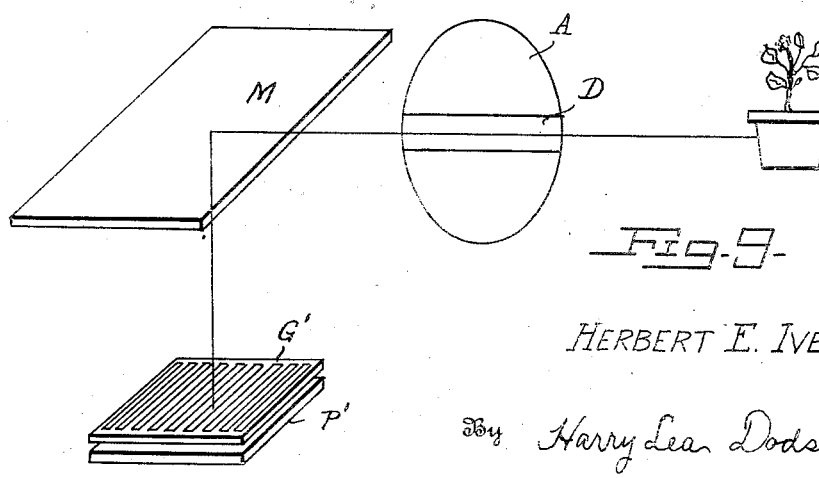

Patented Oct. 11, 1932

1,882,424

UNITED STATES PATENT OFFICE

HERBERT E. IVES, OF MONTCLAIR, NEW JERSEY

METHOD OF MAKING RELIEF PICTURES AND MANNER OF VIEWING SAME

Application filed May 31, 1930. Serial No. 458,303.

My invention relates to "parallax panoramagrams," this being a term which I employ as descriptive of pictures showing stereoscopic relief through a wide range of distances and angles of observation.

Such pictures have heretofore been made by any one of several kinds of camera, in which the object, the photographic lens, the opaque line grating, and the sensitive plate, are given a relative motion during the progress of the exposure. In all cases, whether separation of the grating and plate is depended on to cause the development of the panoramic strips by parallax, or a relative motion is given to plate and grating, a common characteristic is the motion of the lens with respect to the object, whereby different points of view are successively projected upon a grating and plate.

My improved method provides for the use of a photographic lens of very large diameter, meaning thereby large as compared to the distance between the eyes. I am aware that the idea of using a large lens is not new, per se, but the procedure, as disclosed in the prior art, does not give a satisfactory relief picture.

The object of my invention is, to provide a method which, if followed, will produce satisfactory relief pictures, when taken with a wide lens and viewed in the manner hereinafter described.

Reference is to be had to the accompanying drawings, forming a part of this specification, in which similar reference numerals indicate similar parts throughout the entire description, in which—

Fig. 1 shows a method of making parallax panoramagram negatives by a moving lens exposing a sensitive plate behind a grating slightly separated from it, the lens, grating and plate being maintained in line during the exposure;

Fig. 2 shows a method of making similar negatives by a large stationary lens, projecting an image on a stationary plate through a grating slightly separated from it;

Fig. 3 is a diagrammatic view showing the path of light beams to the eye, where the picture is viewed with the grating between the eye and the picture;

Fig. 4 is a similar view, showing the path of the light beams to the eye, where the picture is viewed with the plate between the grating and the eye;

Fig. 5 is a similar view, showing the plate intermediate the eye and the grating, but with the emulsion side of the plate toward the eye; and Fig. 6 is a diagrammatic view, showing the paths of light beams from the large lens, from a viewing screen or grating behind the plate as shown separately in Figs. 7 and 8.

Fig. 7 is a diagrammatic view, showing the paths of light beams through the large lens, in taking the picture. Fig. 8 shows the paths of light beams from the position of the large lens used in taking from a viewing screen or grating behind the plate. Fig. 9 shows diagrammatically the use of a 45° mirror to correct the inversion of the picture either in taking or viewing. Fig. 10 is a perspective view of a grating having lenticular ridges. Fig. 11 is a diagrammatic view showing the wide diaphragm.

In carrying out my invention, I provide a lens A, which would, in the ideal case, subtend as large an angle from the object as does the moving lens B heretofore used, at its extreme positions. It will, of course, be obvious to persons skilled in the art, that in practice, commercial requirements will impose limitations to the size of the lens, though not affecting the theory of operation of my invention.

The relative functions of the moving lens B and of my large diameter lens A are shown in Figs. 1 and 2. It is clear that each element of the large lens A forms an image, similar to the image from the moving lens B when occupying the position of the element. The image, however, is formed by rays which intersect the plane of the grating G and plate P at that side of the normal opposite that which such rays intersect when projected from the moving lens B. This grating may be constructed of a plane provided with alternate opaque and transparent spaces or it may be formed of a plurality of lenticular ridges as shown in Fig. 10.

Disregarding this for the moment, the significant thing to note is, that by a single exposure from the large lens A a multiplicity of strip images may be produced on the sensitive plate P behind and slightly separated from the opaque line grating G. As has long been known in photography, a large diameter lens has the property of "looking around" a solid object. In ordinary photography, however, no means is provided for properly utilizing this property; it results chiefly in poor definition outside the focal plane, or poor depth of focus. When, therefore, an opaque line grating, having wide opaque and narrow clear spaces (say, in the ratio of 10 to 1), is placed between the lens and the plate, the rays striking the plate at various angles are separated from each other, and can then be picked up, on viewing through a similar grating, properly placed, when the eye is in the same position with respect to the image as the acting (unobstructed) lens element was to the object.

A positive contact print, made from a negative according to the showing in Fig. 2, appears on microscopic examination like a regular "parallax panoramagram," i. e. a series of parallel strips, each varying in intensity from side to side. If, however, this positive is placed behind an opaque line grating exactly like that used in taking, and separated by the same distance, it does not yield a stereoscopic, but a pseudoscopic, image. This is due to the inversion of direction of the incident light beams above noted. As is well known, in making stereoscopic pictures by a twin-lens camera, the print must be cut in two and the pictures transposed; or, putting it another way, each picture must be separately rotated about an axis perpendicular to its plane. Inverting prisms are sometimes used in stereoscopic apparatus to obviate this transposition of the image. In the structured image as shown in Fig. 2, the multiple constituent images are related to each other as the twin images from a stereoscopic camera before cutting apart, and there is no way, comparable to the use of inverting prisms, by which the images may be properly oriented. The recovery of a stereoscopic from this pseudoscopic image becomes, therefore, a crucial problem.

I have found it possible to overcome this occurrence of pseudoscopic where stereoscopic vision is desired, by utilizing a fact which has doubtless been noticed frequently by critical observers of "parallax stereograms" and "panoramagrams." If the stereogram or panoramagram is looked at from the back, i. e. if the grating is viewed through the structured picture with a light source S back of the grating, the stereoscopic picture is transformed into a pseudoscopic one. The application to the pictures made by means of the large diameter lens A is immediate. This requires the use of a diaphragm D having a horizontal rectangular opening which extends the width of the lens A. If these are mounted for viewing, with the grating on the side away from the eye, the relief will then be correct. The diagrams shown in Figs. 3 and 4 give the paths of light beams to the two eyes in each case.

It is found, however, owing to the nature of the paths followed by the light rays in taking and viewing the picture, that if the arrangement of plate and grating shown in Fig. 4 is used, the picture will be seen inverted as in a mirror. More serious still is the fact that if a grating is used, identical in spacing with that of the taking grating, as has been previously proposed, the picture is spoiled by the occurrence of interference bands, or moiré pattering, between the lines of the grating and the panoramic strips of which the picture is composed.

The cause of these objectionable features may be very readily understood, by reference to Figs. 6, 7 and 8 if the paths of representative beams from the large lens A are followed, as there shown. In this view, R and L are two beams, corresponding to the right and left eyes, passing through the lens A to the right of the central or axial ray C. They form infinitesimal linear elements $r$ and $l$ of a constituent picture strip, after passing through a clear space $O_1$ in the grating $G_1$, which is separated from the sensitive plate $P_1$ by the distance $d$ (here shown enormously exaggerated for clearness). I make a positive contact print from $P_1$ upon a second sensitive plate $P_2$, and imagine $P_1$ removed so that sensitive surface of $P_2$ occupies the position originally occupied by the negative emulsion layer. I then place a new grating $G_2$ at the same distance behind the positive photographic layer, that $G_1$ occupied in front of the negative layer.

Assuming the two eyes to be placed so as to observe the picture and grating from the approximate position of the lens A, but on the other side of the axial ray C from the rays originally striking the plate, as shown at R' and L', and tracing the rays from R' and L' to the grating space $O_2$, (the grating $G_1$ being removed) it is seen, to a close approximation, the ray from the right eye passes through $r$, and that from the left eye through $l$. The complete image is, moreover, correctly disposed right and left, by virtue of being viewed from the lens side. In short, each eye is receiving the proper view in the proper direction for stereoscopic relief. The image, however, is inverted about a horizontal axis, or is "upside down."

I remedy this defect quite simply, by turning the positive over about a horizontal axis in its own plane, so that its emulsion side is toward the eye, instead of its glass side, as shown in Fig. 5. When this is done, the relief picture has an exposed film surface, which requires an extra covering glass to prevent injury. The same optical result may be attained, while avoiding this inconvenience, by inserting the negative plate backward and exposing through the glass. An optically ideal solution is to use a 45° mirror M in taking or viewing as shown in Fig. 9. (It is indifferent whether this transposes right and left, or up and down.) In practice, however, this transposition may often be omitted, since the mirror image, obtained without transposing, is usually quite satisfactory.

My method of avoiding the second defect hereinbefore referred to, namely, the occurrence of moiré patterning when identical gratings are used for taking and viewing, is also made clear by reference to Fig. 6. Considering the rays $R'$ and $L'$ to the two eyes, from the points $r$ and $l$ on the plate $P_2$, it is seen that these diverge from an opening $O_2$, in the grating $G_2$, which lies farther from the perpendicular to the lens and grating $NN'$ than does the opening $O_1$ in the taking grating $G_1$. The two openings $O_1$ and $O_2$ lie in fact upon the axial ray $C$, to either side of which the corresponding taking and viewing rays are disposed, as already discussed. The viewing grating G, must therefore be magnified as compared to the taking grating $G_1$, or be of coarser spacing, in the proportion shown.

The proportion is exactly defined as follows: If F is the distance between the lens A and the grating $G_1$, and $d$ is the distance between the grating $G_1$ and the sensitive surface of $P_1$, then the distance between the centers of the lines of grating $G_2$ must be larger than the distance between the centers of the lines of grating $G_1$, in the proportion of $F+2d$ to $F$. This enlargement of the viewing grating $G_2$ depends necessarily on the separation $d$ which is chosen, between the grating $G_1$ and the sensitive plate $P_1$, which in turn is governed by the size of the lens A. The separation $d$ should be such that the strips of photographic action behind the clear grating spaces juxtapose so as to utilize completely the whole area of the plate $P_1$.

In the discussion of the paths of the light beams in connection with Fig. 6, it was stated that to a close approximation, both the taking and viewing right and left I beams pass through the same points $r$ and $l$ of the panoramic image strip. This is substantially the case for small angles of incidence, but progressive deviation from this condition occurs as the angle of observation increases. The position of coincidence of the two sets of beams does not lie on the sensitive plate P, but on the normal to the axial ray C. Consequently, the viewing beams for the two eyes in general intersect the plate P farther from the axial ray C than they should, and this error becomes greater the greater the angle of observation, that is, under conditions which are the result of using extremely large diameter lenses, or very large diameter sensitive plates, for taking the pictures. This error can be corrected to some extent by increasing the viewing opening grating somewhat over that called for by the relationship disclosed above, and also by decreasing somewhat the separation between viewing grating and plate as compared to the separation used between taking grating and plate.

In practice, in making relief pictures by my method, I have used a 24-inch focus $f/2$ lens A, which was furnished with a special diaphragm, consisting of a horizontal rectangular slot one inch high, so that the exposures from all parts of the lens A, considered as a series of horizontal elements, would be alike. Exposures were made, of objects to be reproduced in approximately natural size, on $10'' \times 12''$ plates, through a grating G of 50 lines to the inch. Under these conditions, the 12-inch diameter lens A was approximately four feet from the plate P, and a separation of one-twelfth of an inch between grating G and plate P was suitable.

In order to view the positive contact transparency prints made from these negatives, it was found necessary, in practice, to have gratings $G_2$ of approximately one-half of 1% larger line spacing than the taking gratings $G_1$. Although such viewing gratings $G_2$ differ from the taking gratings $G_1$ by only about two lines across their whole width, this difference is absolutely necessary, as is shown by the occurrence of moiré patterning if a grating, of identical spacing to the taking grating, is tried for viewing purposes.

Pictures made by my new method exhibit very satisfactory relief. The angle through which the relief holds is, of course, limited by the size of the lens A used in taking. With pictures thus made, the width of the observation zone cannot exceed 12" at four feet viewing distance. When the eyes move outside this zone the picture repeats itself, after passing through a narrow zone of confusion, where vision is either monocular or pseudoscopic, depending on the width of the dead space between strips. In a sense these pictures are more like lateral series of parallax stereograms, for which the position of the eyes is not so critical as with ordinary sterograms, than they are like true panoranagrams, which latter would present only one relief picture visible through a wide angle. The use of a still larger lens of the same focal length would, of course, make for closer similarity to a true panoramagram. Since the lens consists merely of a horizontal strip section, it is not unreasonable to believe that the technical problem of designing a suitable lens with as high an aperture as F/1 would present no insuperable difficulties.

A great advantage of my method of making relief pictures is the simplicity of the apparatus required, and of its manipulation. A valuable feature is the great shortening of the total exposure time, in that all of the elementary exposures are made simultaneously. With the apparatus described herein, the necessary exposure in strong artificial light is about one second.

Having described my invention, what I regard as new, and desire to obtain by Letters Patent of the United States, is:

1. The combination, with a light source, of a stereoscopic picture, comprising a positive made from a negative consisting of a multiplicity of strip images, made by a single exposure on a stationary photographic plate, in a stationary camera having a wide lens and with a diaphragm having a horizontal rectangular opening which extends the width of said lens, said exposure being made through a stationary grating spaced from said plate, said grating consisting of alternate opaque and transparent vertical lines, and a viewing grating mounted intermediate said picture and said light, the spacing between the vertical lines in the viewing grating being greater than in the taking grating, said picture being mounted, for viewing, with the emulsion side of said plate toward the eye of the observer.

2. The combination, with a light source, of a stereoscopic picture, comprising a positive made from a negative consisting of a multiplicity of strip images, made by a single exposure on a stationary photographic plate, in a stationary camera having a lens of a width comparable in diameter with the object to be photographed and with a diaphragm having a horizontal rectangular opening which extends the width of said lens, said exposure being made through a stationary grating spaced from said plate, said grating consisting of alternate opaque and transparent vertical lines, and a viewing grating, mounted intermediate said picture and said light, the vertical lines in the viewing grating being of greater spacing than in the taking grating, said picture plate being mounted, for viewing, with the emulsion side of said plate toward the eye of the observer.

3. The combination, with a light source, of a stereoscopic picture, comprising a positive made from a negative consisting of a multiplicity of strip images, made by a single exposure on a stationary photographic plate, in a stationary camera having a wide lens and with a diaphragm having a horizontal rectangular opening which extends the width of said lens, said exposure being made through a stationary grating spaced from said plate, said grating consisting of alternate opaque and transparent vertical lines, and a viewing grating mounted intermediate said picture and said light, the spacing between the vertical lines in the viewing grating being greater than in the taking grating.

4. The combination, with a light source, of a stereoscopic picture, comprising a positive made from a negative consisting of a multiplicity of strip images, made by a single exposure on a stationary photographic plate, in a stationary camera having a lens of a width greater than the object to be photographed and with a diaphragm having a horizontal rectangular opening which extends the width of said lens, said exposure being made through a stationary grating spaced from said plate, said grating consisting of alternate opaque and transparent vertical lines, and a viewing grating mounted intermediate said picture and said light, the spacing between the vertical lines in the viewing grating being greater than in the taking grating, said picture plate being mounted, for viewing, with the emulsion side of said plate toward the eye of the observer.

5. The combination, with a light source, of a stereoscopic picture, comprising a positive made from a negative consisting of a multiplicity of strip images, made by a single exposure on a stationary photographic plate, in a stationary camera having a wide lens and with a diaphragm having a horizontal rectagular opening which extends the width of said lens, said exposure being made through a stationary grating spaced from said plate, said grating consisting of alternate opaque and transparent vertical lines, and a viewing grating mounted intermediate said picture and said light, the spacing between the vertical lines in the viewing grating being greater than in the taking grating substantially in the proportion of the distance from the taking lens plus twice the separation of taking grating and sensitive surface to the distance between taking lens and sensitive surface.

6. The combination, with a light source, of a stereoscopic picture, comprising a positive made from a negative consisting of a multiplicity of strip images, made by a single exposure on a stationary photographic plate, in a stationary camera having a wide lens and with a diaphragm having a horizontal rectangular opening which extends the width of said lens, said exposure being made through a stationary grating spaced from said plate, said grating consisting of alternate opaque and transparent vertical lines, and a viewing grating mounted intermediate said picture and said light, the spacing between the vertical lines in the viewing grating being greater than in the taking grating substantially in the proportion of the distance from the taking lens plus twice the separation of taking grating and sensitive surface to the distance between taking lens and sensitive surface, said picture plate being mounted, for viewing, with the emulsion side of said plate toward the eye of the observer.

7. The combination, with a light source, of a stereoscopic picture, comprising a positive made from a negative consisting of a multiplicity of strip images, made by a single exposure on a stationary photographic plate, in a stationary camera having a lens of a width comparable in diameter with the object to be photographed and with a diaphragm having a horizontal rectangular opening which extends the width of said lens, said exposure being made through a stationary grating spaced from said plate, said grating consisting of alternate opaque and transparent lines, and a viewing grating, mounted intermediate said picture and said light, the vertical lines in the viewing grating being of greater spacing than in the taking grating substantially in the proportion of the distance from the taking lens plus twice the separation of taking grating and sensitive surface to the distance between taking lens and sensitive surface, said picture being mounted, for viewing, with the emulsion side of said plate toward the eye of the observer.

8. The combination, with a light source, of a stereoscopic picture, comprising a positive made from a negative consisting of a multiplicity of strip images, made by a single exposure on a stationary photographic plate, in a stationary camera having a lens of a width greater than the object to be photographed and with a diaphragm having a horizontal rectangular opening which extends the width of said lens, said exposure being made through a stationary grating spaced from said plate, said grating consisting of alternate opaque and transparent vertical lines, and a viewing grating, mounted intermediate said picture and said light, the spacing between the vertical lines in the viewing grating being greater than in the taking grating substantially in the proportion of the distance from the taking lens plus twice the separation of taking grating and sensitive surface to the distance between taking lens and sensitive surface, said picture plate being mounted, for viewing, with the emulsion side of said plate toward the eye of the observer.

9. The combination, with a light source, of a stereoscopic picture, comprising a positive made from a negative consisting of a multiplicity of strip images, made by a single exposure on a stationary photographic plate, in a stationary camera having a wide lens and with a diaphragm having a horizontal rectangular opening which extends the width of said lens, said exposure being made through a stationary grating spaced from said plate, said grating consisting of alternate opaque and transparent vertical lines, and a viewing grating mounted intermediate said picture and said light, the spacing between the vertical lines in the viewing grating being greater than in the taking grating, the spacing between the positive and the viewing grating being slightly less than between the negative and the taking grating.

10. The combination, with a light source, of a stereoscopic picture, comprising a positive made from a negative consisting of a multiplicity of strip images, made by a single exposure on a stationary photographic plate, in a stationary camera having a wide lens and with a diaphragm having a horizontal rectangular opening which extends the width of said lens, a 45° mirror mounted in front of said lens to transpose the image, said exposure being made through a stationary grating spaced from said plate, said grating consisting of alternate opaque and transparent vertical lines, and a viewing grating mounted intermediate said picture and said light, the spacing between the vertical lines in the viewing grating being greater than in the taking grating.

11. The combination, with a light source, of a stereoscopic picture, comprising a positive made from a negative consisting of a multiplicity of strip images, made by a single exposure on a stationary photographic plate, in a stationary camera having a lens of a width comparable in diameter with the object to be photographed and with a diaphragm having a horizontal rectangular opening which extends the width of said lens, a 45° mirror mounted in front of said lens to transpose the image, said exposure being made through a stationary grating spaced from said plate, said grating consisting of alternate opaque and transparent vertical lines, and a viewing grating, mounted intermediate said picture and said light, the vertical lines in the viewing grating being of greater spacing than in the taking grating.

12. The method of taking and viewing stereoscopic pictures, comprising the making of a negative, consisting of a multiplicity of strip images, by a single exposure on a stationary photographic plate, in a stationary camera, having a wide lens and with a diaphragm having a horizontal rectangular opening which extends the width of said lens, said exposure being made through a stationary grating spaced from said plate, said grating consisting of alternate opaque and transparent vertical lines, mounting in front of a light a positive contact print made from said negative, and viewing said positive with a grating having alternate opaque and transparent vertical lines, the spacing of said lines in said viewing grating being greater than in the taking grating, said viewing grating being located between said positive and said light.

13. The combination, with a light source, of a stereoscopic picture, comprising a positive made from a negative consisting of a multiplicity of strip images, made by a single exposure on a stationary photographic plate, in a stationary camera having a wide lens and with a diaphragm having a horizontal rectangular opening which extends the width of said lens, a 45° mirror mounted behind said lens to transpose the image, said exposure being made through a stationary grating spaced from said plate, said grating consisting of alternate opaque and transparent vertical lines, and a viewing grating mounted intermediate said picture and said light, the spacing between the vertical lines in the viewing grating being greater than in the taking grating.

14. The combination, with a light source, of a stereoscopic picture, comprising a positive made from a negative consisting of a multiplicity of strip images, made by a single exposure on a stationary photographic plate, in a stationary camera having a lens of a width comparable in diameter with the object to be photographed and with a diaphragm having a horizontal rectangular opening which extends the width of said lens, a 45° mirror mounted behind said lens to transpose the image, said exposure being made through a stationary grating spaced from said plate, said grating consisting of alternate opaque and transparent vertical lines, and a viewing grating, mounted intermediate said picture and said light, the vertical lines in the viewing grating being of greater spacing than in the taking grating.

15. The method of taking and viewing stereoscopic pictures, comprising the making of a negative, consisting of a multiplicity of strip images, by a single exposure on a stationary photographic plate, in a stationary camera, having a wide lens and with a diaphragm having a horizontal rectangular opening which extends the width of said lens, said exposure being made through a stationary grating spaced from said plate, said grating consisting of lenticular ridges, mounting in front of a light a positive contact print made from said negative, and viewing said positive with a grating consisting of alternate opaque and transparent vertical lines, the spacing between said vertical lines in said viewing grating being greater than the spacing of the ridges in the taking grating, said viewing grating being located between said positive and said light.

16. The method of taking and viewing stereoscopic pictures, comprising the making of a negative, consisting of a multiplicity of strip images, by a single exposure on a stationary photographic plate, in a stationary camera, having a wide lens and with a diaphragm having a horizontal rectangular opening which extends the width of said lens, said exposure being made through a stationary grating spaced from said plate, said exposure being made with the plate mounted with its emulsion side away from the grating, said grating consisting of alternate opaque and transparent vertical lines, mounting in front of a light a positive contact print made from said negative, with its emulsion side toward the light, and viewing said positive with a grating having alternate opaque and transparent vertical lines, said viewing grating being of greater line spacing than the taking grating, said viewing grating being located between said positive and said light.

17. The method of taking and viewing stereoscopic pictures, comprising the making of a negative, consisting of a multiplicity of strip images, by a single exposure on a stationary photographic plate, in a stationary camera, having a wide lens and with a diaphragm having a horizontal rectangular opening which extends the width of said lens, said exposure being made through a stationary grating spaced from said plate, said exposure being made with the plate mounted with its emulsion side away from the grating, said grating consisting of lenticular ridges, mounting in front of a light a positive contact print made from said negative, with its emulsion side toward the light, and viewing said positive with a grating consisting of alternate opaque and transparent vertical lines, the spacing between said vertical lines in the viewing grating being greater than the spacing of the ridges in the taking grating, said viewing grating being located between said positive and said light.

HERBERT E. IVES.